United States Patent
Biel

(10) Patent No.: US 7,420,736 B2
(45) Date of Patent: Sep. 2, 2008

(54) METHOD FOR DETERMINING OPTIMUM GRATING PARAMETERS FOR PRODUCING A DIFFRACTION GRATING FOR A VUV SPECTROMETER

(75) Inventor: Wolfgang Biel, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 246 days.

(21) Appl. No.: 10/547,145

(22) PCT Filed: Jan. 17, 2004

(86) PCT No.: PCT/DE2004/000058

§ 371 (c)(1),
(2), (4) Date: Aug. 24, 2005

(87) PCT Pub. No.: WO2004/076996

PCT Pub. Date: Sep. 10, 2004

(65) Prior Publication Data

US 2006/0146344 A1    Jul. 6, 2006

(30) Foreign Application Priority Data

Feb. 25, 2003  (DE) ................................ 103 07 884

(51) Int. Cl.
   *G02B 5/18* (2006.01)
(52) U.S. Cl. ........................ 359/570; 359/569; 359/900; 359/350; 356/328

(58) Field of Classification Search .......... 359/569–575, 359/566; 356/305, 328, 334; 378/71, 82
See application file for complete search history.

(56) References Cited

U.S. PATENT DOCUMENTS 4,063,818 A * 12/1977 Lepere ....................... 356/334
4,241,999 A * 12/1980 Pouey ........................ 356/331
5,052,766 A * 10/1991 Noda et al. .................. 359/15

OTHER PUBLICATIONS

Peter L. Hagelstein, "Nearly stigmatic toroidal grazing-incidence spectrometer in the 100-300 A range: design", Applied Optics 31(10), pp. 1464-1471(1992).*
M. P. Chrisp, 'X-ray spectrograph design', Appl. Opt., vol. 22, No. 10, May 15, 1983, pp. 1519-1529.*
P. L. Hagelstein, 'Nearly stigmatic toroidal grazing incidence spectrometer in the 100-300-Angstrom range: design', vol. 31, No. 10, Apr. 1, 1992, pp. 1464-1471.*

(Continued)

*Primary Examiner*—Arnel C Lavarias
(74) *Attorney, Agent, or Firm*—Andrew Wilford

(57) ABSTRACT

A method for determining a set of grating parameters for producing a diffraction grating for a vacuum-ultraviolet spectrometer, the parameters used being the small and large radius of the toroidal grating substrate, the two distances between the two holographic illumination points and the grating origin, the angular position of the holographic illumination points in relation to the grating normal, and the laser wavelength for the holographic illumination. The method determines respective optimum grating parameters on numeric iterative paths for a specific problem definition. The method thus advantageously enables the production of a VUV spectrometer having a diffraction grating that for a predetermined wavelength range produces a minimum line width on the detector with a large range.

11 Claims, 6 Drawing Sheets

OTHER PUBLICATIONS

Holographic Concave Gratings for Use . . . by Kolke et al. (Appl. Optics Nov. 1986).
Nearly Stigmatic Toroidal Grazing-Incidence Spectometer . . . by P.L. Hagelstein (Appl. Optics, Apr. 1992).
Numerical Design Method for Aberration Reduced . . . by McKinney et al. (Appl. Optics Aug. 1987).
Tewchnique for Narrow-Band Imgaging . . . by Wilkinson et al. (Appl. Optics, Jul. 2001).

* cited by examiner

METHOD FOR DETERMINING OPTIMUM GRATING PARAMETERS FOR PRODUCING A DIFFRACTION GRATING FOR A VUV SPECTROMETER

CROSS REFERENCE TO RELATED APPLICATIONS

This application is the US national phase of PCT application PCT/DE2004/000058 filed 17 Jan. 2004 with a claim to the priority of German patent application 10307884.3 itself filed 25 Feb. 2003.

FIELD OF THE INVENTION

The invention relates to a method of determining optimal grating parameters for a holographic diffraction grating, especially for a diffraction grating for a VUV spectrometer with a planar detector.

STATE OF THE ART

1. VUV-Spectrometer and Grating Technology

All elements and their (incompletely ionized) ions can be singularly identified based upon their characteristic line emissions or radiation and so distinguished from one another. For the measurement of this radiation today one usually utilizes a spectrometer which spectrally breaks up the radiation of a diffraction grating and detects the spectra thus formed with a detector in terms of the intensity as a function of wavelength.

The most intensive resonance lines of most elements and practically all ions lie in the vacuum ultraviolet wavelength regions (VUV, about 1 nm to about 200 nm). The radiation in this wavelength range is absorbed by material and, in addition the reflectivity of all materials drops sharply with the wavelength in this range. Consequently spectrometers in the VUV range must operate under vacuum and must utilize only a single optical component to ensure the detection of the radiation with sufficient transmission/efficiency. The development of detector technology (MCP detectors, linear arrays or CCD-chips) enables the spectra projected onto a planar surface of a typical size of 25 to 40 mm in width to be sharply imaged.

VUV spectrometers are thus comprised to date of three typical elements, namely the entry or inlet gap (elongated slit of two sharp and precise edges at a spacing of several 10 µm), an image forming diffraction grating and a (planar) detector. For the two-fold problem of spectral decomposition and optical imaging on the detector, the diffraction grating has been provided as a reflection grating with concave or toroidal surfaces. The production of this grating can be carried out by two processes which have proved themselves in practice:

A) Mechanical engraving of the grating lines in the substrate by means of a diamond point.

B) Holographic exposure of a thin layer of a photo-resist on the substrate by means of laser light from two points. The grating lines result as an interference pattern upon the substrate and following exposure are subjected to a wet chemical and ion etching treatment.

In the use of image-forming diffraction gratings in the VUV range, imaging errors can arise, that is a point in the entry gap can be imaged because of the grating with a more or less large field (and not as a point) on the detector. As a result there is a loss of resolution and a reduction in the efficiency of the spectrometer. The state of the art with respect thereto is as follows:

Up to about the year 1970, gratings could only be produced by the method A) and with concave substrates with straight and parallel grating lines (classical Rowland gratings). This gave rise for example to spectrometer configurations in which the spectrum lay along a circle (on the "Rowland circle"). The use of planar detectors however resulted in images which were not sharp. In addition, significant light losses arose (typically by a factor of 2 to 10) as a result of astigmatism in the imaging. Engraved gratings had in addition a high level of light scattering because the grating lines were not perfectly uniform. To describe a Rowland grating, two numbers suffice: the radius of curvature of the substrate and the "grating constant" (number of lines per mm).

From about 1970 technique B) has increasingly been used. A method of producing diffraction gratings is known for example from OS 19 67 039. Using symmetrical illumination from a great distance, one can produce almost parallel grating lines with a constant spacing. These correspond to the classical Rowland grating with its imaging defects or aberration. Nevertheless holographically produced gratings have significantly less stray light or scattering than mechanically engraved gratings because the grating lines are more uniform than those which can be made by mechanical engraving.

By varying the spacing and incident angle of both holographic illumination points one can achieve a variable spacing and curvature of the grating lines on the substrate by means of which the imaging defect or aberration of the grating can be reduced. Especially, a sharper image can be achieved on a planar detector and the light loss through astigmatism can be largely avoided.

Various concepts for minimization of the imaging error (aberration) have been developed since about 1970 and for example are referred to as "type 1" to "type 4" aberration-corrections (Jobin-Yvon). The method can be used with concave and toroidal substrates. The scattered light level is low. Such a corrected grating can however only be used for a certain specific spectrometer configuration (spacing, angle, wavelength range).

The holographic grating is as a rule described by 7 numerical values (holographic grating parameters): the two radii of curvature of the substrate $\rho$ and $R$, the laser wavelength $\lambda_L$ which is used in each of the coordinates for describing the positions of the two light points (for example distances $r_C$, $r_D$ and incident angles $\gamma$ and $\delta$).

In the 80's, investigations were carried out with computer-controlled mechanical engraving machines with which mechanically engraved gratings with cured grating lines of variable spacing were produced. This technique however in spite of the high cost was unable to solve the stray light problem of these gratings.

Since VUV spectroscopy is costly from a technological point of view and is thus only used in special cases, worldwide there are only a small number of firms working in the field and only a limited number of suppliers of standardized gratings and spectrometers and therefore an especially limited market for special case systems.

The technology for producing holographic gratings appears to be limited to two firms (Jobin-Yvon and Zeiss). For the detection of the radiation with spectrometers in the VUV range, at the present time usually open MCP detectors are used. These convert the VUV photons into free electrons, amplify them and convert the electronic pulses into visible light of a phosphor screen so that the visible light can be registered by a suitable camera system. MCP detectors however have a finite local resolution, that is each primary side individual electron event produces at the detector output, a light spot of finite magnitude, which has approximately a spatial intensity distribution in the form of a Gaussian bell curve of a width of about 50 to 80 μm.

Newer precision measurements as to the MCP characteristic, which have been carried out in connection with the development of spectroscopic instruments for satellites, however, now allow a further optimization of the efficiency of the overall VUV spectrometer system. For this purpose, the installation angle of the MCP in the spectrometer is so selected that the incident angle of the VUV radiation upon the MCP surface lies exactly at the maximum of the angle dependent detection efficiency of the detector. Position and installation angles of the detector can be counted among the spectrometer parameters and must be considered as input magnitudes in the determination of the grating design.

The VUV spectrometer should have a high efficiency to be able to carry out investigations with high time resolution and at the same time with good wavelength resolution so that many spectral lines can be simultaneously observed in an isolated manner. Efficiency is given by the product and the effective etendue [spread or range] and grating efficiency (this is the fraction of the incident light which is diffracted in the first order diffraction). The effective etendue is the product of three magnitudes: illuminated area of the inlet gap; illumination space angle; fraction of the radiation coming from the grating which encounters the detector within its sensitive area.

2. VUV-Spectroscopy in Fusion Experiments

The technical application of the VUV spectroscopy is in the field of fusion experiments. Along the way to commercial utilization of nuclear fusion, throughout the world experiments are being carried out with magnetically contained hydrogen plasmas with the goal of maximizing the product of particle density, temperature and containment time. In these hot plasmas with densities above $10^{19}$ m$^{-3}$ and temperatures in the range of several keV, apart from hydrogen isotopes, other elements (plasma impurities) with concentrations in the parts per thousand or parts per hundred range can arise and which are liberated for example as components from the wall of the vessel by the unavoidable plasma wall contact and pass into the plasma. The plasma impurities can significantly affect the plasma properties: on the one hand they can displace hydrogen ions from (quasineutral) plasma and dilute thereby the fusion fuel. On the other hand they can reduce the power density and give rise to a cooling of the plasma which is undesirable at the center of the plasma but can be of positive effect at the edge of the plasma (for example greater uniformity with respect to the coupling out of power). To optimize the fusion plasma, therefore, a precise knowledge of the impurity content in the plasma and the transport characteristics of plasma impurities is required.

An important diagnostic for the identification of plasma impurities is spectroscopy since all chemical elements and their (incompletely ionized) ions can be singularly distinguished based upon their characteristic radiation lines. Under the above-mentioned plasma conditions with magnetically contained fusion plasmas, the most intensive resonance line of the usual elements and practically all ions lie in the vacuum ultraviolet wavelength range (VUV, about 1 nm to about 200 nm). To be able to reliably identify all relevant plasma impurities, a permanent and inclusive observation of a large wavelength range with good wavelength resolution is required so as to be able to simultaneously measure and distinguish as many different spectral lines as is possible simultaneously.

To determine the transport characteristics of the plasma impurities usually transient experiments are carried out in which a pulse of relatively short duration of plasma impurities is additionally introduced into the plasma and the advance of the front of the particles from the plasma edge from the plasma edge toward the plasma center is spectroscopically observed. For such investigations, spectrometers are required which have a high time resolution. This demonstrates that on the one hand requirements as to detector technology and on the other hand efficient spectrometers are necessary to ensure that a sufficient number of photons per spectral line and per time step will be acquired and thus sufficient measurement precision (dependent upon the count of the acquired photons) for example in a Poisson distribution) will be achieved.

OBJECT OF THE INVENTION

The object of the invention is to provide a holographic diffraction grating which can be used in a VUV spectrometer with a planar detector for a predetermined wavelength range, especially of 2.5 nm to 160 nm, with a minimum line width at the detector with high etendue.

SUMMARY OF THE INVENTION

The object of the invention is attained on the one hand by a method of determining grating parameters for the production of a diffraction grating wherein a) the wavelength range to be observed is established, b) the height and width of the detector of the spectrometer is determined, c) the starting parameters for the following spectrometer parameters are determined:

d) the width and height of the inlet gap, e) the distance $L_A$ from the inlet gap to the center point of the grating, f) the incident angle α of the light with respect to a grating normal, g) the width and height of the diffraction grating, h) the distance $r_{ao}$ from the grating center point to the meridional focus of zero order, and i) the angular setting of the detector, j) the laser wavelength $\lambda_L$ for the holographic exposure of the grating substrate is determined, k) the greater radius of curvature R of the grating substrate is determined, l) the smaller radius of curvature ρ of the grating substrate, the line density G at the center point of the grating and the wavelength of the detector center point are iteratively determined, m) the position of the detector and the angle at which the light of the first order from the grating falls upon the detector are determined, n) of the remaining four variables including the distances ($r_c$ and $r_d$) of the two holographic illumination points from the grating center point and their angular positions γ and δ with respect the grating normals, one of the two angles γ is eliminated based upon the mean line count of the grating, o) the minimum of the magnitude Δλ is determined iteratively as a function of the three remaining variables (spacings $r_C$, $r_D$ and angle δ), whereby a set of variables $r_C$, $r_D$ and δ are obtained as a solution for which the Δλ is an absolute minimum. The object of the invention is attained further by a diffraction grating as further described below whose manufacturing parameters are obtained by the aforementioned methods.

The subject matter of the invention is especially a method of obtaining and determining grating parameters with the aid of which advantageous diffraction gratings can be made for a VUV spectrometer with a planar detector and which, by comparison with the state of the art, is significantly better, especially in terms of minimal line width at the detector with a high etendue.

It has been found, in accordance with the invention in achieving the object of minimizing mean line width of the spectral line in the detector plane that certain variables should be determined. The variables as far as the desired minimum is concerned are the following seven grating parameters: the smaller and larger radii of the toroidal grating substrates, the spacing of the holographic illumination points from the grating origin, the angle setting of the holographic illumination points to the grating normal, and the laser wavelength for the holographic illumination. As boundary conditions so-called spectrometer parameters like for example the dimensions of the inlet gap and of the detector, the spacing of the endless gap and the detector from the center point of the grating, incident angle and emerging angle of the beam to the grating normal and the wavelength range of interest are initially predetermined. These are largely varied within the corresponding band width based upon the mechanical and/or physical requirements.

To achieve this object for a predetermined wavelength range which as a rule is determined by a physical measurement requirement, a VUV spectrometer with a MCP detector is provided which initially will have a design of the diffraction grating spectrometer such that a minimum line width with simultaneously maximum overall efficiency is reached for the certain wavelength range. The requisite total efficiency is given for example for the expected radiation intensity of the measured object, namely, the fusion plasma and the requisite measurement precision. The goal in the first place is to determine the optimal grating design and secondly the determination of the optimum angular setting of the detector and thirdly the determining of the overall arrangement (spectrometer parameters) for that system. Since the second point depends upon the first and third, the process is iteratively carried out.

Physical and Technological Boundary Conditions

I) On the one hand, the line density of the diffracting grating should not exceed a value of 2000-2500 per mm since up to now this has been the technological limits of the fabrication processes. On the other hand, the line density should not be less than a value of several hundred since otherwise the physical limits of the diffraction process will be reached.

II) There are a number of boundary conditions for the selection of the incident angle $\alpha$ of the beam upon the diffraction grating:

The reflectivity of the grating surface and thus diffraction efficiency of the grating are angle dependent and wavelength dependent. The lower wavelength limit below which the reflectivity disappearance and complete absorption arises is generally proportional to the cosine of the incident angle $\alpha$ to the grating normal:

$\lambda_{limit} \approx \lambda_p \times \cos(\alpha)$ with $\lambda_p \approx 15$ nm for gold or platinum.

To produce sufficiently large reflectivity at the lower end of the chosen wavelength range, as a practical matter an incident angle is selected whose associated limiting wavelength is by a factor of at least 2.5 smaller than the minimal wavelength $\lambda_{min}$ of the spectrometer.

Simultaneously however, the etendue and thus the efficiency of the spectrometer falls with grazing light incidence (increasing angle $\alpha$) also in proportion to the cosine of the incident angle with the grating normals. From the conditions a) and b), incident angles are chosen by the relationship $$\alpha \approx \arccos\left(\frac{\lambda_{min}}{2.5 \times 15 \text{ nm}}\right).$$

An incident angle of more than 87° gives rise to extreme radii of curvature of the grating substrate and thus disadvantageously to increased aberration and increasing light scattering. This angle range is therefore excluded from the outset. As a consequence the sensible application range of this spectrometer concept is limited to wavelengths above about 2 nm.

(III) The size of the spectrometer should if possible remain limited (cost questions, mechanical stability, spatial requirements) thus gives rise for a predetermined wavelength range via the grating equations, to the smallest possible "armlength" that is the distance between the grating and the detector) as well as to a high line density of the grating. Here however the boundary condition I must be observed.

(IV) The assembly angle of the detector in the spectrometer should be so selected that the local incident angle of the deflected light on the detector corresponds to the maximum detection efficiency of the MCP detectors.

(V) For the exposure process for the producing holographic grating optical tables of a finite size are used and, in addition, the optical holder of the aperture diaphragm, which serves as a point light source for use in exposure, has a finite magnitude. In that case. A uniform illumination of the grating substrate can only be achieved when the incident angle on the grating is not too inclined. From these three conditions, the is technical limits for minimum and maximum spacing and the maximum angle of the aperture diaphragm position are given for the holographic exposure.

Development of a Diffraction Grating

For the development and production of a diffraction grating for a spectrometer, the determination of the grating parameters and the boundary conditions are only respective partial steps. The entire process can be set forth as follows.

A) Determination of the wavelength range to be observed (minimal and maximal wavelengths in nm) as well as the detector size (width).

B) Selection of the angle setting of the detector boundary conditions: with the open MCP detectors mainly used in the VUV range, the detector efficiency depends strongly upon the wavelength and the incident angle of the beam upon the detector surface.

C) Choice of the incident angle of the beam upon the diffraction grating. Physical boundary conditions:

The reflectivity of the grating coding depends upon wavelength and incident angle.

A highly grazing incidence with an incident angle greater than 87° to the grating normal gives rise to extreme radii of curvature and is thus unsuitable for toroidal grating substrates.

D) Selection of the arm length of the spectrometer (distance from the inlet gap to the grating center point and distance from the grating center point to the meridional focus of zero order).

E) Boundary conditions: From step A to C and the arm length, the line density of the grating is given and in the present case a value of 2000-2500 lines per mm is not to be exceeded. A greater arm length gives a smaller line density although the mechanical construction of the spectrometer is made more dear.

F) Numerical correction of a grating design (determination of the seven holographic grating parameters). This point is described in greater detail in paragraphs F.1 to F.8.

G) Numerical analysis of the grating characteristics by ray-tracing calculations (spot diagrams, determination of the effective etendue and line width) for the thus determined set of the seven grating parameters and the spectrometer created based thereon, the overall performance is numerically simulated. For this purpose as described under paragraphs F.7, numerous beam paths are numerically simulated including for a plurality of wavelengths, especially for at least five different wavelengths with homogeneous illumination at the inlet gap and gratings with for example each 50,000 individual beams. From the so-called spot diagram at the detector (gap images of the first order) including the remaining aberration and apparatus profile of the spectral line. As a result one obtains the mean line width of the spectrometer as well as the effective etendue.

H) Repetition of the steps (C to G) for different grating and gap diameters (variation of the etendue) to determine the configuration with optimal line width for a given etendue.

I) Optional repetition of steps (C to G) including F.3 to F.8 for different arm lengths to determine a configuration with optimal line width for a given etendue.

J) Calculation of the grating efficiency as a function of the wavelength by a grating manufacturer (this is not possible with the here developed software).

K) Optional repetition of steps F.1c to F.1g including steps (C to G) for different incident angles to determine a configuration with optimal line width for a given etendue.

L) The selection for a given application of an optiam configuration comprised of the 7 holographic grating parameters as well as the spectrometer parameters (arm length, incident angle, grating size, gap size, detector size).

Dimensions of the Grating Design

The aforementioned point F which is the numerical determination of the grating design is mathematically a minimization process. As "boundary conditions" starting values are used from the spectrometer parameters (dimensions, spacings, angles, wavelength range) to minimize the line width, the mean line width of the spectral lines is projected on the detector plane. The variables based upon which the minimum is sought are the seven aforementioned grating parameters. After determination of the grating parameters, the entire system (VUV spectrometer) is tested with respect to the line width attained and efficiency by means of ray tracing estimations numerically and the technological boundary conditions are tested for their maintenance and optimum utilization. As a result data as to the diffraction efficiency of the grating is delivered which can also be calculated by the grating manufacturer. The multiple repetitions of the process for different selected spectrometer parameters gives rise finally for the problem which has been set forth (for example predetermined wavelength range and/or other geometrical properties).

For a predetermined uncertainty the individual method steps for determining the seven grating parameters which are optimal for it (point F) can be described as follows:

F.1) Assume a spectrometer parameter, to the extent it has not been predetermined by the points A to D, especially:

F.1)a) Assume the wavelength range which is to be observed (minimum and maximum wavelengths in nm which are to be determined by the detector and which are to be predetermined based upon the physical measurement task.

F.1)b) Assume the height and breadth of the detector (for example standard values). These assumptions follow for example from available detector technology.

F.1)c) Assume an incident angle a of the light with respect to the grating normal: in this case especially the boundary condition II must be observed.

F.1)d) Angle setting ("MCP angle") of the detector: See boundary condition IV. The angle setting of the detector must be determined iteratively since the exact incident angle of the beam upon the detector depends also upon the grating parameter.

F.1)e) Assume a spacing LA from the inlet gap to the center point of the grating and the spacing $r_{so}$ from the grating center point to the meridional focus of zero order: both distances can be selected freely as long as the boundary conditions I and III are observed. However should both distances be selected to be equal, an advantage is gained of a symmetrical configuration and minimum aberration.

F.1)f) Assume a width and height of the inlet gap: These values are in principle freely chosen. With an increase there is an increase in the etendue although the line width becomes poorer (that is increases).

F.1)g) Assume a width and height of the deflection grating: with an increase in the size of the deflection grating, the etendue increases and the line width becomes poorer (increases) and therefore disadvantageous while the fabrication cost rises.

F.2) A selection of the laser wavelength AL for the holographic illumination or exterior of the grating substrate then follows. This value is supplied by the grating manufacturer. It is determined by the available laser technology and the sensitivity of the photoresist which is used. The number of variables still to be sought is thereby reduced to six.

F.3) The larger radius of curvature I of the grating substrate is determined from the meridianal focusing conditions of zero order. The number of variables still to be sought is thereby reduced to 5.

F.4) Then follows the iterative determination of the following parameters:

Smaller radius of curvature p of the grating substrate, the line density G at the center point of the grating and the wavelength at the center point of the detector. For this purpose the grating equation and the saggital focusing condition of the first order are used. The number of variables still to be sought is thereby reduced to 4.

F.5) Step F.4 allows an exact determination of the position of the detector in a simple way (from a linear equation) and the angle (from the grating equation) at which the light of first order from the grating will fall upon the detector.

F.6) of the remaining four variables (spacing of the two holographic illumination points from the center point of the grating and their angle settings the grating normals), one of the two angles (here: γ) can be eliminated based upon the knowledge of the mean line count of the grating. To satisfy minimization requirements, a minimum of a function involving the three remaining variables (spacings $r_c$, $r_D$ and δ) is determined.

F.7) To satisfy the minimization requirement, the spectrometer is numerically simulated in terms of an approximation and the geometric optics thereof. For a given set of $r_c$, $r_D$ and δ, the beam path in the spectrometer is numerically generated for 5 wavelengths and, respectively for a large number (at least several 1000) different beam paths (various starting points at the inlet gap as well as various respective impingement points on the grating). For each individual beam, the impingement point on the detector is determined using the Fermat principle (minimizing the light path length). The magnitude to be minimized is the line width Δλ at the detector (averaged over all wavelengths) which depends upon the position of all calculated impingement points and upon the spatial resolution of the detector used. To determine the output side line width, for each impingement point on the detector, a Gaussian bell curve is summed with a width corresponding to the detector resolution. By superimposing all of the Gaussian curves, one obtains a resultant intensity distribution of the spectral lines which can be displayed as a plot.

F.8) By means of an iterative search strategy, the entire range of the three variables ($r_c$, $r_D$ and δ) are explored for a minimum of the magnitude Δλ. In this manner on a grid of a predetermined step width on the plane ($r_c$, $r_D$) for each pair of values ($r_c$, $r_D$) an absolute minimum of the magnitude Δλ is determined with respect to the variable δ. This minimum determination with respect to 6 at each location ($r_c$, $r_D$) is so effected that initially the entire permissible angle range is explored with a coarse grid and then a fine determination is made of the exact minimum position by means of a Newtonian process. To limit the calculation time, the entire exploration of the plane ($r_c$, $r_D$) is initially undertaken with a coarse grid (step width for example 20 mm) and then in successively smaller explored regions with a fine grid (for example a finest step width of 1 mm).

At the end a set of variables $r_c$, $r_D$ and ρ is obtained as a solution for which Δλ is an absolute minimum.

BRIEF DESCRIPTION OF THE DRAWING

Below the subject matter of the invention is described in greater detail in connection with six figures, four examples and five tables without thereby limiting the scope of the invention to them. They show.

SPECIFIC DESCRIPTION

Figure 1:
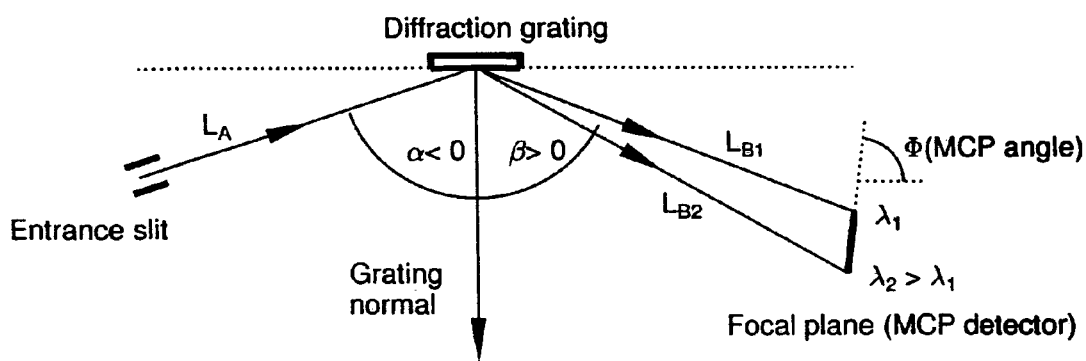
FIG. 1: the configuration of a spectrometer (from above)
Figure 2:
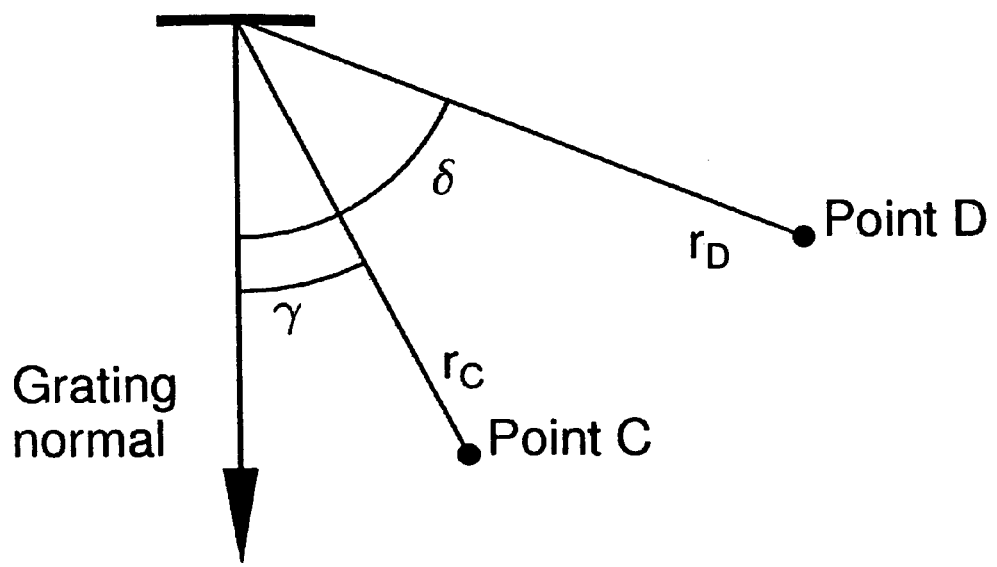
FIG. 2: a sketch of the holographic grating-exposure (from above)

Forschungszentrum Julich GmbH has participated since 1999 in the development of diagnostics for the new plasma experiment W7-X which is expected to go into operation in about 2008 in Greifswald. In the field of VUV spectroscopy, a spectrometer should be developed which will cover in a gap-free manner the entire wavelength range from 2.5 nm to 160 nm.

In the framework of the technology here used, a further increase in the observed wavelength range (to about 1 nm or to about 200 nm) can be achieved and/or it is possible to increase the resolution basically by an increase in the number of devices with corresponding selection of the wavelength segments. For the present case, a number of four spectrometers can be an effective compromise between budgetary requirements and the U-10 observation posts available with W7-X.

Within the framework of this invention, the following four spectrometers with optimum diffraction gratings for four slightly overlapping wavelength ranges have been developed:

Spectrometer 1: 2.5 nm to 10.5 nm

Spectrometer 2: 9.0 nm to 24.0 nm

Spectrometer 3: 20 nm to 66 nm

Spectrometer 4: 60 nm to 160 nm

In the establishment of the wavelength range, the spectral positions of the most important spectral lines as well as the availability of calibration methods and calibration light sources were considered. The new spectrometers should have a high efficiency to enable investigations with high time resolution and simultaneously should have, however, good wavelength resolution so that many spectral lines can be observed isolated from one another simultaneously. The overall efficiency of the spectrometer is given by the product of its effective etendue, the grating efficiency (this is the fraction of the incident light which is diffracted in the first order diffraction) and the detection efficiency of the detector. The effective etendue is the product of three magnitudes:

The illuminated area of the entry gap or inlet gap;

The illuminated spatial angle;

The proportion of the radiation from the grating which impinges on the detector within its sensitivity area.

Up to now, there has not existed for such applications any suitable standard grating. Grating manufacturers like Jobin-Yvon/Horiba (manufacturers of holographic gratings) or Zeiss (specialists for applications in optics and also holographic gratings) make available the technology for producing holographic gratings however to the extent that the requisite grating parameters can be predetermined or given.

As a consequence, it is first required to determine the seven parameters of a holographic diffraction grating for a corresponding VuV spectrometer with a planar detector so that for the predetermined spectrometer parameters (dimensions, spaces, angle, wavelength range), a minimum line width at the detector (determined over the wavelength range) can be produced with high etendue (light intensity). Suitable designs of holographically corrected gratings for the spectrometer to be developed are generally not available from the grating manufacturers.

Rowland gratings for the aforementioned wavelength range are partly available. A use of such gratings gives rise, detrimentally, to spectrometers which have a significantly reduced etendue (a factor of 2 to 10) and a poorer resolution than can be achieved with corrected holographic gratings.

The invention has found, that it is possible to minimize the mean line width of the spectral lines in the detector plane. The variables which are required to achieve the desired minimum are the seven grating parameters. As boundary conditions, the spectrometer parameters, like for example, dimensions, spacings, angle and wavelength are first given. In further procedures, however, within corresponding band widths, they are varied or modified based upon mechanical and/or physical factors.

SPECIFIC EMBODIMENTS

Below the results of four grating designs have been set forth. The following definitions apply:

A. Holographic grating parameter:

R: Greater radius of the toroidal grating substrate

ρ: Smaller radius of the toroidal grating substrate $r_c$, $r_d$: Spacing of the holographic illumination or exposure points from the grating origin γ, δ: Angular position or setting of the holographic illumination or exposure points to the grating normal λ: Laser wavelength B: Spectrometer parameters $L_A$: Inlet gap/grating center point spacing, $r_{so}$: Spacing from grating origin to meridional focus of zero order $L_B$: Spacing of grating center point to detector, α: Incident angle of the radiation to the grating normal, β: Emergent angle of the beam to the grating normal, λ: Wavelength of the radiation within a previously defined wavelength range line density at the grating origin, MCP angle: Setting angle of detector relative to grating tangent, THE: Proportion of the emergent radiation which encounters the detector within a vertical region of predetermined height.

Detailed Description of the Grating Designs

Design 1 is for a spectrometer in the wavelength range of 2.5 nm to 10.5 nm.

Design 2 is for a spectrometer in the wavelength range of 9.0 nm to 24.0 nm.

Design 3 is for a spectrometer in the wavelength range of 20 nm to 66 nm.

Design 4 is for a spectrometer in the wavelength range of 60 nm to 160 nm.

All four new designs are intended for use in fusion experiment W7-X in the following description of the four FIGS. 3 to 6 all dimensions are in mm and all angles in °. The origin is at the center point of the diffraction grating.

Table 1 As to the parameters for FIGS. 3 to 6:

TABLE 1

Figure 3:
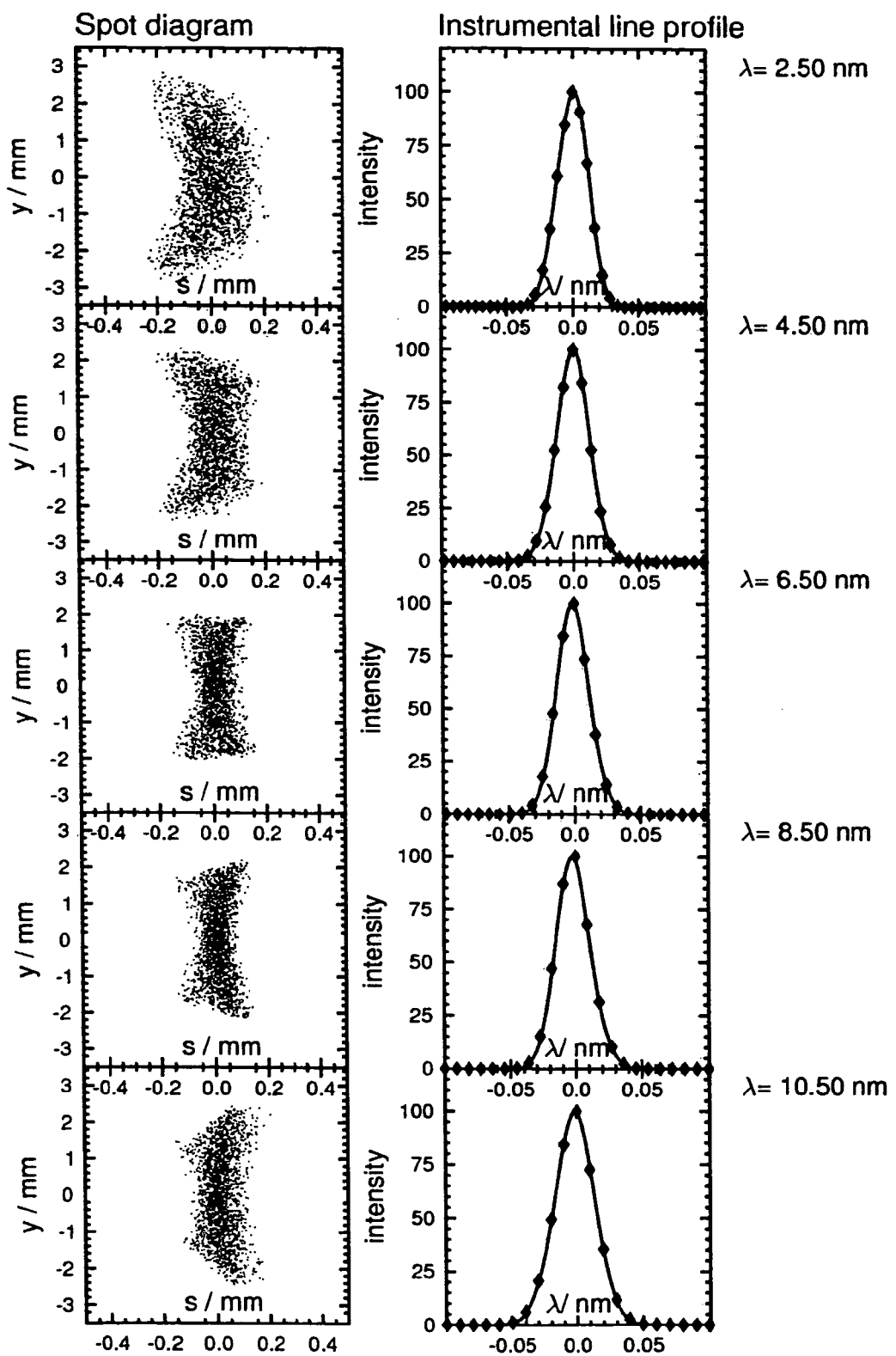
FIGS. 3 to 6: simulated spectral distributions (spot diagrams) and corresponding instrumental profiles for four different wavelengths ranges as well as the sets of grating parameters corresponding thereto.
Figure 4:
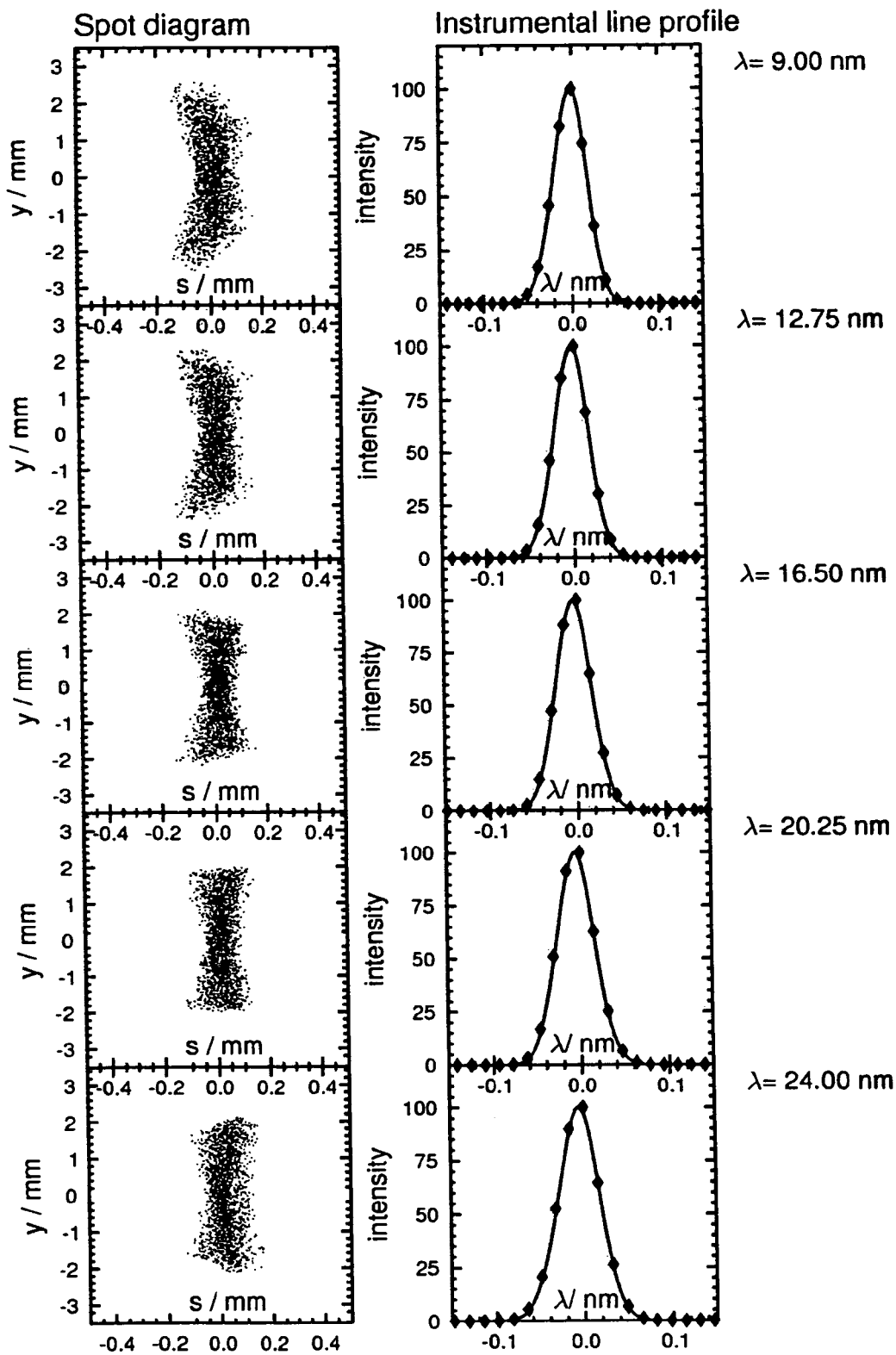
Figure 5:
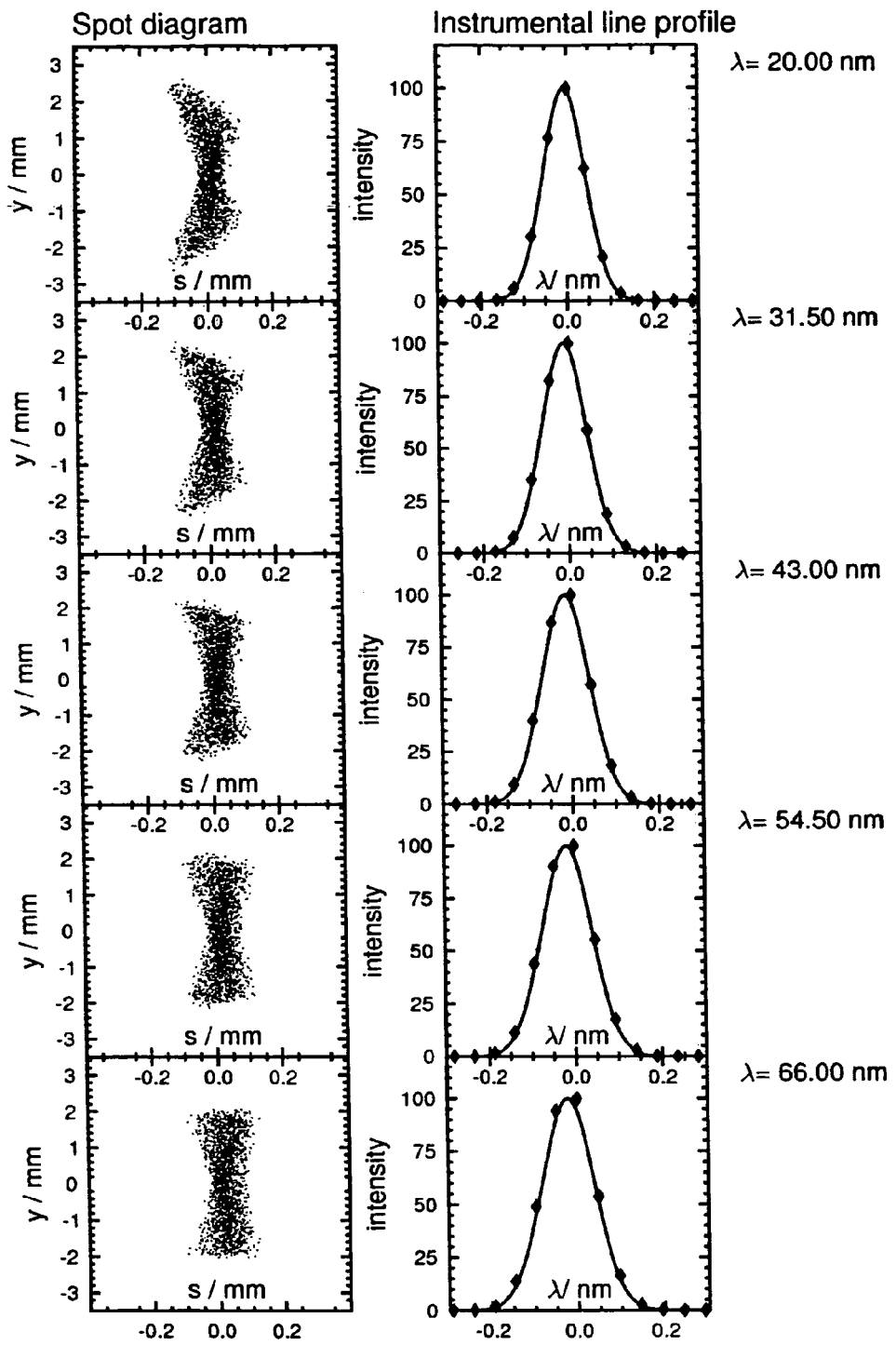
Figure 6:
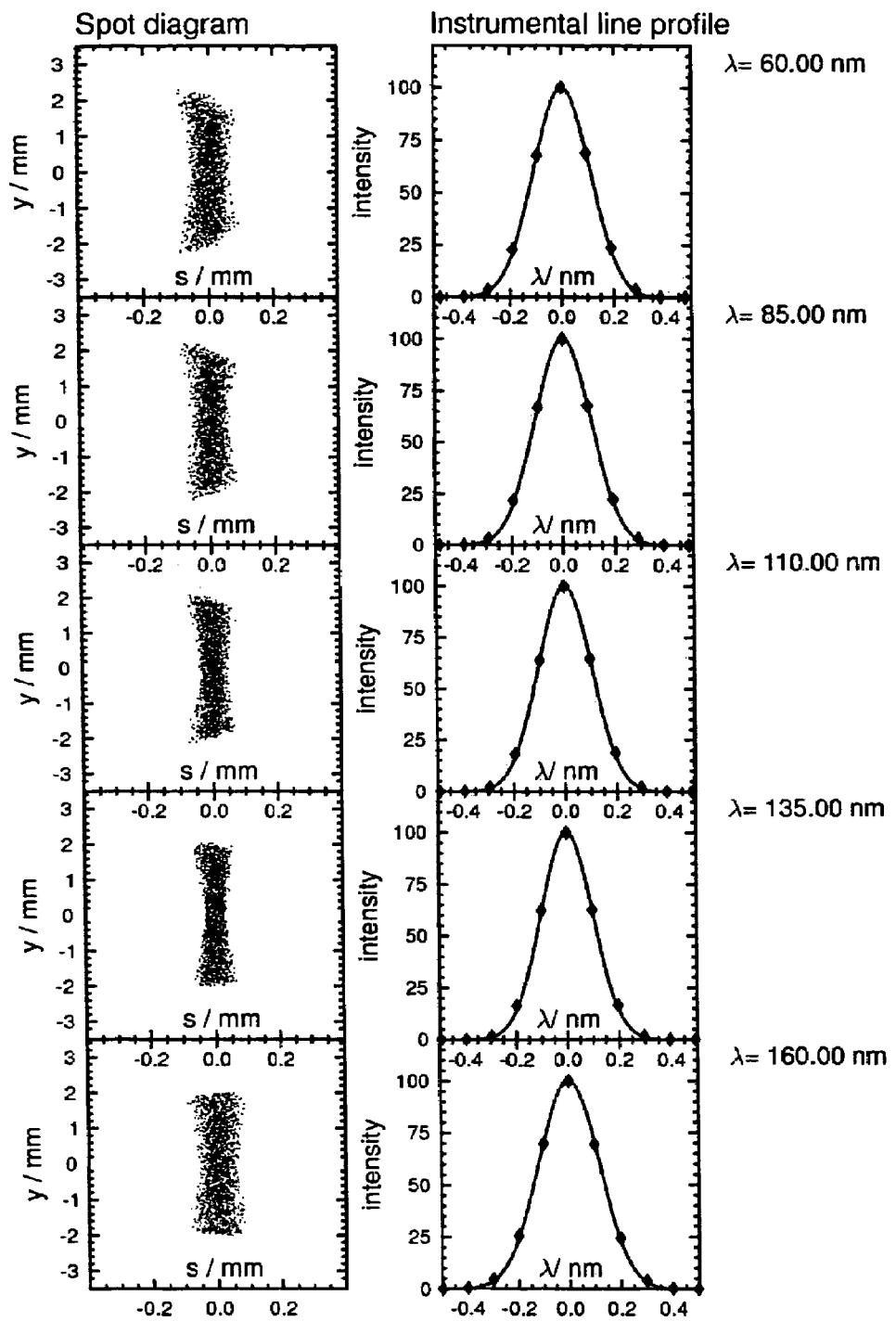

As to the parameters for FIGS. 3 to 6:

|  |  | FIG. 3 | FIG. 4 | FIG. 5 | FIG. 6 |
|---|---|---|---|---|---|
| A. Grating Parameter | | | | | |
| Greater Radius | R | 6451.0 | 1860 | 828.2 | 495.0 |
| Smaller Radius | ρ | 52.0 | 132.8 | 165.7 | 264.2 |
| Spacing of the Illumination Points | $r_c$ | 328 | 327 | 337 | 362 |
|  | $r_d$ | 1000 | 1000 | 1000 | 1000 |
| Angle Setting of the Illumination Pts. | γ | 4.74 | −2.65 | 19.60 | 32.60 |
|  | δ | 75.0 | 75.0 | 75.0 | 75.0 |
| Laser Wavelength | $\lambda_L$ | 487.98 | 487.98 | 487.98 | 487.98 |
| B. Spectrometer Parameters | | | | | |
| Line Density | G | 1810.27 | 2074.07 | 1291.98 | 875.49 |
| Instant Angle of the Beam | α | −86.0 | −76.0 | −65.0 | −45.0 |
| Emergence Angle of the Beam | $β_1$ | 83.24 | 72.11 | 61.70 | 40.89 |
|  | $β_2$ | 78.11 | 67.00 | 55.19 | 34.54 |
| Spacing: Inlet Gap-grating center point | $L_A$ | 450 | 450 | 350 | 350 |
| Spacing: grating origin-meridianal focus 0 order | $r_{sO}$ | 450 | 450 | 350 | 350 |
| Setting Angle Detector | MCP | 79.2 | 71.1 | 62.7 | 47.9 |
| Spacing: Grating Center Point-Detector | $L_{B1}$ | 447.95 | 448.42 | 349.77 | 352.19 |
|  | $L_{B2}$ | 446.91 | 449.50 | 352.74 | 359.27 |
| Gap Height |  | 3.8 | 3.8 | 3.8 | 3.8 |
| Gap Width |  | 0.22 | 0.12 | 0.06 | 0.06 |
| Grating Height |  | 4.5 | 8.0 | 9.0 | 9.0 |
| Grating Width |  | 24 | 24 | 30 | 18 |
| Aperture |  | 50 | 50 | 15 | 15 |

TABLE 2 as to the spot diagram and instrumental profile for FIG. 3:

|  | Wave Length | | | | |
|---|---|---|---|---|---|
|  | 2.5 | 4.5 | 6.5 | 8.5 | 10.5 |
| Optical Line Width | 0.0267 | 0.0261 | 0.0240 | 0.0238 | 0.0283 |
| Band Pass Line Width | 0.0266 | 0.0262 | 0.0246 | 0.0250 | 0.0294 |
| Detected Line Width | 0.0285 | 0.0294 | 0.0290 | 0.0304 | 0.0355 |
| Etendue in $10^{-5}$ [mm²sr] | 2.8099 | 3.0091 | 3.1357 | 3.0730 | 2.9735 |
| Transmission | 0.20007 | 0.21425 | 0.22327 | 0.21880 | 0.21171 |
| Proportion of Emergent Beam which encounters the detector at a predetermined height (THE) | 0.90455 | 0.96596 | 0.99894 | 0.98598 | 0.94938 |

TABLE 3 as to the spot diagram and instrumental profile for FIG. 4:

|  | Wave Length | | | | |
|---|---|---|---|---|---|
|  | 9.00 | 12.75 | 16.50 | 20.25 | 24.00 |
| Optical Line Width | 0.0378 | 0.0372 | 0.0381 | 0.0398 | 0.0426 |
| Band Pass Line Width | 0.0387 | 0.0386 | 0.0394 | 0.0416 | 0.0443 |
| Detected Line Width | 0.0454 | 0.0464 | 0.0479 | 0.0505 | 0.0546 |
| Etendue in $10^{-5}$ [mm²sr] | 0.97527 | 1.0125 | 1.0398 | 1.0541 | 1.0296 |
| Transmission | 0.37131 | 0.38547 | 0.39587 | 0.40133 | 0.39198 |
| Proportion of Emergent Beam which encounters the detector at a predetermined height (THE) | 0.93350 | 0.96922 | 0.99293 | 1.0000 | 0.98658 |

TABLE 4 as to the spot diagram and instrumental profile for FIG. 5:

|  | Wave Length | | | | |
|---|---|---|---|---|---|
|  | 20.0 | 31.5 | 43.0 | 54.5 | 66.0 |
| Optical Line Width | 0.0761 | 0.0799 | 0.0878 | 0.0933 | 0.0998 |
| Band Pass Line Width | 0.0838 | 0.0895 | 0.0964 | 0.1017 | 0.1087 |
| Detected Line Width | 0.1136 | 0.1205 | 0.1284 | 0.1347 | 0.1414 |
| Etendue in $10^{-5}$ [mm²sr] | 1.9920 | 2.0524 | 2.0832 | 2.0993 | 2.1113 |
| Transmission | 0.49982 | 0.51498 | 0.52271 | 0.52674 | 0.52976 |
| Proportion of Emergent Beam which encounters the detector at a predetermined height (THE) | 0.94072 | 0.96369 | 0.98110 | 0.99157 | 0.99695 |

TABLE 5 as to the spot diagram and instrumental profile for FIG. 6:

|  | Wave Length | | | | |
|---|---|---|---|---|---|
|  | 60.0 | 85.0 | 110.0 | 135.0 | 160.0 |
| Optical Line Width | 0.1800 | 0.1753 | 0.1535 | 0.1417 | 0.2079 |
| Band Pass Line Width | 0.1854 | 0.1917 | 0.1721 | 0.1609 | 0.2189 |

TABLE 5-continued as to the spot diagram and instrumental profile for FIG. 6:

| | Wave Length | | | | |
|---|---|---|---|---|---|
| | 60.0 | 85.0 | 110.0 | 135.0 | 160.0 |
| Detected Line Width | 0.2586 | 0.2576 | 0.2451 | 0.2389 | 0.2790 |
| Etendue in $10^{-5}$ [mm$^2$sr] | 2.0745 | 2.0890 | 2.1036 | 2.1247 | 2.1309 |
| Transmission Proportion of Emergent Beam which encounters the detector at a pre-determined height (THE) | 0.65349 | 0.65806 | 0.66266 | 0.66929 | 0.67125 |

The invention claimed is:

1. A method of determining a set of grating parameters for the production of a diffraction grating for a vacuum-ultraviolet spectrometer whereby the parameters are the small radius and the large radius of a toroidal grating substrate ($\rho$ and R), the two distances ($r_c$ and $r_d$) of two holographic illumination points from the grating center, the angular positions ($\gamma$ and $\delta$) of the holographic illumination points to grating normals and the laser wavelength (($\lambda_L$) for the holographic illumination and whereby the method comprises the following steps:
   a) establishing the wavelength range to be observed,
   b) determining the height and width of the detector of the spectrometer,
   c) determining the starting parameters for the following spectrometer parameters:
   d) the width and height of the inlet gap,
   e) the distance $L_A$ from the inlet gap to the center point of the grating,
   f) the incident angle $\alpha$ of the light with respect to a grating normal,
   g) the width and height of the diffraction grating,
   h) the distance $r_{so}$ from the grating center point to the meridional focus of zero order, and
   i) the angular setting of the detector,
   j) determining the laser wavelength $\lambda_L$ for the holographic exposure of the grating substrate,
   k) determining the greater radius of curvature R of the grating substrate,
   l) iteratively determining the smaller radius of curvature $\rho$ of the grating substrate, the line density G at the center point of the grating and the wavelength at the detector center point,
   m) determining the position of the detector and the angle at which the light of the first order from the grating falls upon the detector,
   n) of the remaining four variables including the distances ($r_c$ and $r_d$) of the two holographic illumination points from the grating center point and their angular positions $\gamma$ and $\delta$ with respect the grating normals, eliminating one of the two angles $\gamma$ based upon the mean line count of the grating,
   o) determining the minimum of the magnitude $\Delta\lambda$ iteratively as a function of the three remaining variables (spacings $r_c$, $r_D$ and angle $\delta$), whereby a set of variables $r_C$, $r_D$ and $\delta$ are obtained as a solution for which the $\Delta\lambda$ is an absolute minimum.

2. The method according to claim 1, further comprising the step of
   obtaining on the basis of the seven grating parameters obtained and the boundary conditions of the spectrometer resulting therefrom, the mean line unit and effective etendue.

3. The method according to claim 1 wherein steps c) to o) are repeated for at least ten different configurations of grating or gap measurements or arm lengths.

4. A computer program which can be loaded into a memory of a digital computer and has a software code for carrying out the method of claim 1.

5. A computer program system with a computer program according to claim 4.

6. The method according to claim 1, further comprising the step of
   using the grating parameters obtained to produce a diffraction grating.

7. The production of a diffraction grating according to the method of claim 1 using the following grating parameters there obtained:

| | |
|---|---|
| greater radius | (R) = 6451 mm, |
| shorter radius | ($\rho$) = 52.0 mm, |
| Spacing of the illumination points | ($r_c$) = 328 mm, |
| | ($R_d$) = 1000 mm, |
| angular setting of the illumination | ($\gamma$) = 4.74 |
| | ($\delta$) = 75.0 |
| laser wavelength | ($\lambda_L$) = 487.98 nm. |

8. The production of a diffraction grating wherein the following grating parameters, obtained by the method according to claim 1 are used:

| | |
|---|---|
| greater radius | (R) = 1860 mm, |
| smaller radius | ($\rho$) = 132.8 mm, |
| spacing of the illumination points | ($r_c$) = 327 mm, |
| | ($R_d$) = 1000 mm, |
| angular position of the illumination points | ($\gamma$) = -2.65 |
| | ($\delta$) = 75.0 |
| laser wavelength | ($\lambda_L$) = 487.98 nm. |

9. The production of a diffraction grating wherein the following grating parameters obtained by the method of claim 1 are used:

| | |
|---|---|
| greater radius | (R) = 8.28.2 mm, |
| smaller radius | ($\rho$) = 165.7 mm, |
| spacing of the illumination points | ($r_c$) = 337 mm, |
| | ($R_d$) = 1000 mm, |
| angular position of the illumination points | ($\gamma$) = 19.6 |
| | ($\delta$) = 75.0 |
| laser wavelength | ($\lambda_L$) = 487.98 nm. |

10. The production of a diffraction grating wherein the following grating parameters are used as obtained by the method of claim 1

| | |
|---|---|
| greater radius | (R) = 495 mm, |
| smaller radius | ($\rho$) = 164.2 mm, |
| spacing of the illumination points | ($r_c$) = 362 mm, |
| | ($R_d$) = 1000 mm, |
| angular position of the illumination points | ($\gamma$) = 32.6 |
| | ($\delta$) = 75.0 |
| laser wavelength | ($\lambda_L$) = 487.98 nm. |

11. The use of one of the diffraction gratings of claim 7 in a vacuum-ultraviolet spectrometer.

* * * * *